(12) United States Patent
Sontag

(10) Patent No.: US 11,220,034 B2
(45) Date of Patent: Jan. 11, 2022

(54) BLOCKED SHRINK BUNDLING FILM

(71) Applicant: Berry Global, Inc., Evansville, IN (US)

(72) Inventor: Jason M. Sontag, Emerson, NJ (US)

(73) Assignee: Berry Global, Inc., Evansville, IN (US)

( * ) Notice: Subject to any disclaimer, the term of this patent is extended or adjusted under 35 U.S.C. 154(b) by 343 days.

(21) Appl. No.: 16/104,269

(22) Filed: Aug. 17, 2018

(65) Prior Publication Data

US 2019/0054675 A1 Feb. 21, 2019

Related U.S. Application Data

(60) Provisional application No. 62/546,747, filed on Aug. 17, 2017.

(51) Int. Cl.

| | |
|---|---|
| *B29C 48/21* | (2019.01) |
| *B29C 48/08* | (2019.01) |
| *B29C 48/10* | (2019.01) |
| *B29C 48/00* | (2019.01) |
| *B32B 27/08* | (2006.01) |
| *B32B 27/32* | (2006.01) |
| *B32B 27/30* | (2006.01) |
| *B29K 23/00* | (2006.01) |
| *B29K 105/02* | (2006.01) |

(52) U.S. Cl.
CPC .......... *B29C 48/21* (2019.02); *B29C 48/0018* (2019.02); *B29C 48/08* (2019.02); *B29C 48/10* (2019.02); *B32B 27/08* (2013.01); *B32B 27/306* (2013.01); *B32B 27/32* (2013.01); *B29K 2023/065* (2013.01); *B29K 2023/0633* (2013.01); *B29K 2023/083* (2013.01); *B29K 2105/02* (2013.01); *B32B 2250/05* (2013.01); *B32B 2307/30* (2013.01)

(58) Field of Classification Search
CPC . B29C 48/21; B29C 48/0021; B29C 48/0017; B29C 48/0018
See application file for complete search history.

(56) References Cited

U.S. PATENT DOCUMENTS

| | | | | |
|---|---|---|---|---|
| 5,100,721 | A | * | 3/1992 | Akao ............... B32B 27/08 428/218 |
| 5,158,836 | A | | 10/1992 | Schirmer |
| 5,219,666 | A | | 6/1993 | Schirmer |
| 5,298,202 | A | | 3/1994 | Schirmer |
| 5,389,448 | A | | 2/1995 | Schirmer |
| 5,407,732 | A | | 4/1995 | Dokurno |
| 5,456,979 | A | | 10/1995 | Schirmer |
| 5,549,943 | A | | 8/1996 | Vicik |

(Continued)

FOREIGN PATENT DOCUMENTS

| | | | | |
|---|---|---|---|---|
| CN | | 101318392 A | * 12/2008 | |
| WO | WO-2017055174 A1 | * | 4/2017 | ............ B32B 27/08 |

OTHER PUBLICATIONS

International PCT Search Report and Written Opinion for PCT App. No PCT/US18/46844, established Nov. 20, 2018, BP-520 PCT || 29 pages.

*Primary Examiner* — Joseph S Del Sole
*Assistant Examiner* — Jerzi H Moreno Hernandez
(74) *Attorney, Agent, or Firm* — Barnes & Thornburg LLP

(57) ABSTRACT

Multi-layered blocked shrink bundling films include at least one layer that contains a blocking polymer. Materials and methods for forming multi-layered blocked shrink bundling films via a blown film extrusion process are described.

20 Claims, 4 Drawing Sheets

(56) References Cited

U.S. PATENT DOCUMENTS

| | | |
|---|---|---|
| 5,674,607 A | 10/1997 | Schirmer |
| 5,674,608 A | 10/1997 | Schirmer |
| 5,677,383 A | 10/1997 | Chum |
| 5,804,020 A * | 9/1998 | Akao ................... B29C 65/02 |
| | | 156/251 |
| 5,847,053 A | 12/1998 | Chum |
| 5,972,444 A | 10/1999 | Patel |
| 6,111,023 A | 8/2000 | Chum |
| 6,306,969 B1 | 10/2001 | Patel |
| 6,723,398 B1 | 4/2004 | Chum |
| 6,906,141 B2 | 6/2005 | Chum |
| 7,052,753 B1 | 5/2006 | Tse |
| 7,659,343 B2 | 2/2010 | Wooster |
| 8,076,421 B2 | 12/2011 | Kapur |
| 8,263,206 B2 | 9/2012 | Kronawittleithner |
| 8,318,862 B2 | 11/2012 | Michie, Jr. |
| 8,617,677 B2 | 12/2013 | Trouilhet |
| 9,206,303 B2 | 12/2015 | Yun |
| 2004/0167286 A1 | 8/2004 | Chum |
| 2004/0234800 A1 | 11/2004 | Arthurs |
| 2005/0187352 A1 | 8/2005 | Chum |
| 2006/0046048 A1 | 3/2006 | Kapur |
| 2006/0106351 A1 | 5/2006 | Lareau |
| 2007/0093603 A1 | 4/2007 | Wooster |
| 2007/0135563 A1 | 6/2007 | Simmons |
| 2007/0172685 A1 | 7/2007 | Kapur |
| 2007/0298273 A1 | 12/2007 | Thies |
| 2008/0202075 A1 | 8/2008 | Kronawittleithner |
| 2009/0297810 A1 * | 12/2009 | Fiscus ................... B32B 5/02 |
| | | 428/220 |
| 2010/0040875 A1 | 2/2010 | Patel |
| 2010/0119745 A1 | 5/2010 | Nieto |
| 2010/0203311 A1 | 8/2010 | Michie, Jr. |
| 2010/0209640 A1 | 8/2010 | Yun |
| 2011/0318560 A1 | 12/2011 | Yun |
| 2012/0028065 A1 | 2/2012 | Bafna |
| 2012/0100356 A1 | 4/2012 | Ohlsson |
| 2012/0217682 A1 | 8/2012 | Vignola |
| 2012/0219776 A1 | 8/2012 | Vignola |
| 2013/0029553 A1 | 1/2013 | Trouilhet |
| 2013/0252005 A1 | 9/2013 | Savargaonkar |
| 2014/0096825 A1 | 4/2014 | Bonekamp |
| 2014/0262426 A1 | 9/2014 | Hatlewick |
| 2015/0210042 A1 | 7/2015 | Tapio |
| 2018/0304595 A1 * | 10/2018 | Planeta ................ B32B 27/302 |

* cited by examiner

BLOCKED SHRINK BUNDLING FILM

PRIORITY CLAIM

This application claims priority under 35 U.S.C. § 119(e) to U.S. Provisional Application Ser. No. 62/546,747, filed Aug. 17, 2017, which is expressly incorporated by reference herein.

BACKGROUND

The present disclosure relates to polymeric materials, and particularly to polymeric films. More particularly, the present disclosure relates to multi-layered shrink films formed from polymeric material.

SUMMARY

According to the present disclosure, a shrink bundling film is made using a manufacturing process. The manufacturing process comprises the steps of extruding two or more extrudable materials through a die to form a molten tubular film, injecting the molten tubular film with air to form a film bubble, and collapsing the film bubble to form the shrink bundling film.

In illustrative embodiments, the manufacturing process used to form the shrink bundling film further includes the step of drawing the film bubble away from the die, thereby imparting orientation to the resultant shrink bundling film. Optionally, the manufacturing process may further include the step of promoting blocking between adjacent layers of the collapsed film bubble.

In illustrative embodiments, at least two or more extrudable materials are extruded through the die to form at least a three-layered molten tubular film. In illustrative embodiments, at least one of the three or more extrudable materials extruded through the die comprises a blocking polymer, which is configured so as to provide an interior surface of the film bubble. Upon collapse of the film bubble, a first interior surface of the film bubble adheres to an adjacent second interior surface of the film bubble via blocking.

In illustrative embodiments, a blocked shrink bundling film comprises a multi-layer structure comprising a central film layer comprised of a blocking polymer.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In illustrative embodiments, the present disclosure provides a multi-layered, shrink bundling film that includes at least one layer comprised of a blocking polymer. As used herein, blocking polymer refers to a polymer having an inherent tendency to block (i.e., form an attraction and/or adhere to an adjacent layer of film or sheet, thus rendering separation of the individual layers difficult).

In illustrative embodiments, a multi-layered, blocked shrink bundling film in accordance with the present disclosure is prepared using a blown film extrusion process. In a blown film extrusion process in accordance with the present disclosure, a three-layered film bubble may be collapsed upon itself to form a lay-flat tube in which two adjacent central layers comprise a blocking polymer. These adjacent layers fuse together, thereby producing a five-layered blocked shrink film structure. Similarly, in other embodiments, a four-layered film bubble may be collapsed upon itself to form a seven-layered blocked shrink film, a five-layered film bubble may be collapsed upon itself to form a nine-layered blocked shrink film, and so forth.

Upon collapse of the film bubble formed during the blown film extrusion process, interior surfaces of the film bubble, which comprise a blocking polymer, are fused together. As a result, a thinner, stronger, and higher shrink film may be obtained as compared to conventional shrink bundling films. The process used to form the multi-layered, blocked shrink bundling film takes advantage of the higher draw down ratio to blow up ratio in order to increase shrink and other properties. The draw down is twice as much, which allows the film to be stretched thinner. Moreover, the amount of orientation in the film may be increased as well.

Figure 1:
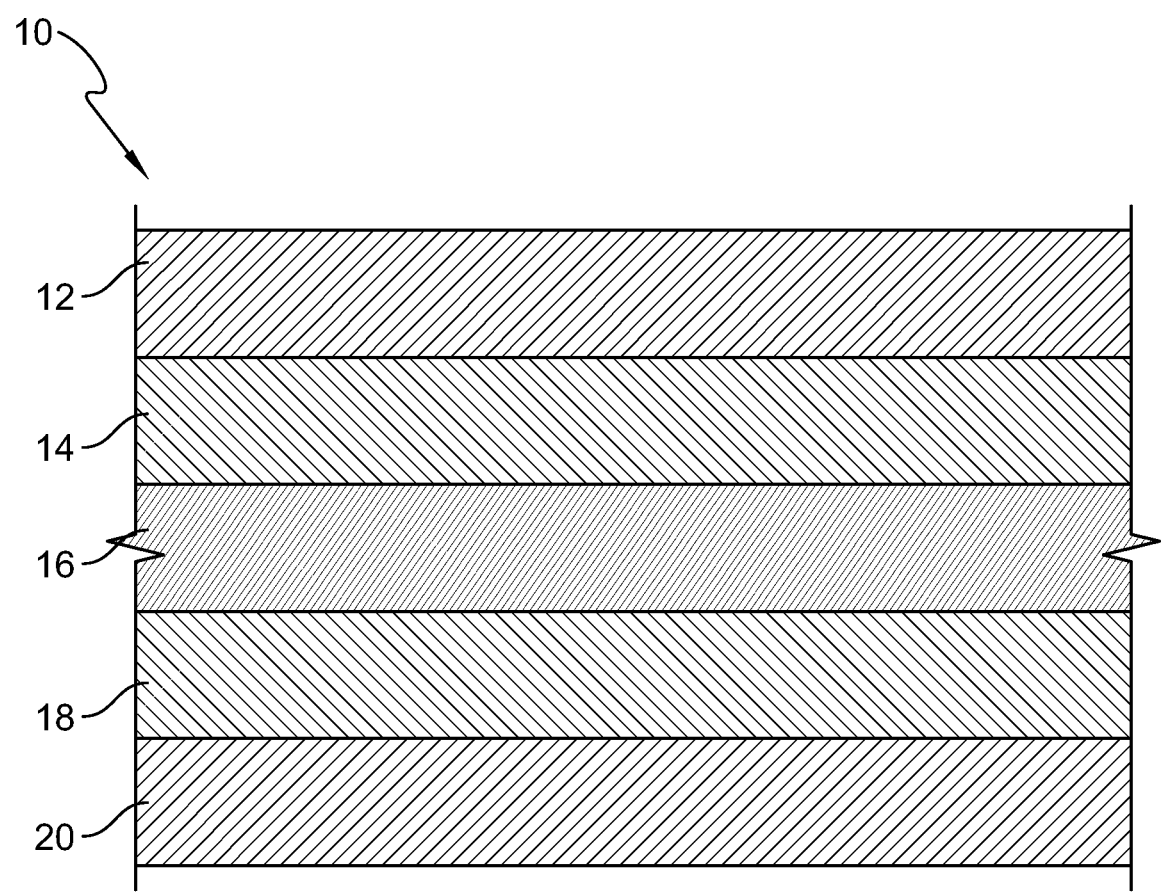
FIG. 1 is a diagrammatic view of a representative first embodiment of a blocked shrink bundling film that includes five layers.

A first embodiment of a multi-layered, blocked shrink bundling film 10 in accordance with the present disclosure is shown, for example, in FIG. 1. The multi-layered blocked shrink film 10 has a five-layer structure and includes a first layer 12, a second layer 16, a third layer 14 interposed between the first layer 12 and the second layer 16, a fifth layer 20, and a fourth layer 18 interposed between the second layer 16 and the fifth layer 20. The second layer 16 includes a blocking polymer. Each of the first layer 12, the third layer 14, the fourth layer 18, and the fifth layer 20 may include a thermoplastic polymer (or combination of thermoplastic polymers).

In some embodiments, one or more of the first layer 12, the second layer 16, the third layer 14, the fourth layer 18, and the fifth layer 20 may contain a thermoplastic polymer or combination of thermoplastic polymers. The choice of the thermoplastic polymer or combination of thermoplastic polymers in each of the first layer 12, the second layer 16, the third layer 14, the fourth layer 18, and the fifth layer 20 shown is FIG. 1 is independent of the other layers. However, in illustrative embodiments, the second layer 16 contains a blocking polymer (e.g., very low density polyethylene, ultra-low density polyethylene, an ethylene-alpha olefin copolymer, and/or the like), the first layer 12 and the fifth layer 20 are identical, and the third layer 14 and the fourth layer 18 are identical. The symmetry of this five-layered structure arises from the blown film extrusion process, whereby a three-layered molten tubular film forms a film bubble which, upon collapse and blocking, results in the final five-layered structure shown in FIG. 1. The process is further explained below in references to FIGS. 2 and 3.

The thermoplastic polymer (or combination of thermoplastic polymers) used to make the blocked shrink bundling film 10 in accordance with the present disclosure is not restricted, and may include all manner of thermoplastic polymers. In illustrative embodiments, the thermoplastic polymer is a polyolefin, including but not limited to homopolymers, copolymers, terpolymers, and/or blends thereof.

Representative polyolefins that may be used in accordance with the present disclosure include but are not limited to low density polyethylene (LDPE), high density polyethylene (HDPE), linear low density polyethylene (LLDPE), metallocene polyethylene (mPE), very low density polyethylene (VLDPE), ultra-low density polyethylene (ULDPE), polypropylene, ethylene-propylene copolymers, polymers made using a single-site catalyst, ethylene maleic anhydride copolymers (EMAs), ethylene vinyl acetate copolymers (EVAs), polymers made using Zeigler-Natta catalysts, styrene-containing block copolymers, and/or the like, and combinations thereof. Methods for manufacturing LDPE are described in *The Wiley Encyclopedia of Packaging Technology*, pp. 753-754 (Aaron L. Brody et al. eds., 2nd Ed. 1997) and in U.S. Pat. No. 5,399,426, both of which are incorporated by reference herein, except that in the event of any inconsistent disclosure or definition from the present specification, the disclosure or definition herein shall be deemed to prevail. ULDPE may be produced by a variety of processes, including but not limited to gas phase, solution and slurry polymerization as described in *The Wiley Encyclopedia of Packaging Technology*, pp. 748-50 (Aaron L. Brody et al. eds., 2nd Ed. 1997), incorporated by reference above, except that in the event of any inconsistent disclosure or definition from the present specification, the disclosure or definition herein shall be deemed to prevail. ULDPE may be manufactured using a Ziegler-Natta catalyst, although a number of other catalysts may also be used. For example, ULDPE may be manufactured with a metallocene catalyst. Alternatively, ULDPE may be manufactured with a catalyst that is a hybrid of a metallocene catalyst and a Ziegler-Natta catalyst. Methods for manufacturing ULDPE are also described in U.S. Pat. Nos. 5,399,426, 4,668,752, 3,058,963, 2,905,645, 2,862,917, and 2,699,457, each of which is incorporated by reference herein in its entirety, except that in the event of any inconsistent disclosure or definition from the present specification, the disclosure or definition herein shall be deemed to prevail. The density of ULDPE is achieved by copolymerizing ethylene with a sufficient amount of one or more monomers. In illustrative embodiments, the monomers are selected from 1-butene, 1-hexene, 4-methyl-1-pentene, 1-octene, and combinations thereof. Methods for manufacturing polypropylene are described in *Kirk-Othmer Concise Encyclopedia of Chemical Technology*, pp. 1420-1421 (Jacqueline I. Kroschwitz et al. eds., 4th Ed. 1999), which is incorporated herein by reference, except that in the event of any inconsistent disclosure or definition from the present specification, the disclosure or definition herein shall be deemed to prevail.

In illustrative embodiments, a polyolefin for use in accordance with the present disclosure includes polyethylene. In one example, the polyethylene includes a combination of low density polyethylene and high density polyethylene. In another example, the polyethylene includes a combination of low density polyethylene, high density polyethylene, and metallocene polyethylene. In another example, the polyolefin includes a combination of linear low density polyethylene, high density polyethylene, and low density polyethylene. In a further example, the polyolefin includes a combination of linear low density polyethylene and low density polyethylene. In a further example, the polyolefin includes a combination of linear low density polyethylene, high density polyethylene, low density polyethylene, and a solid filler.

The solid filler for use in accordance with the present disclosure is not restricted, and may include all manner of inorganic or organic materials that are non-reactive with thermoplastic polymer and configured for being uniformly blended and dispersed in the thermoplastic polymer. In illustrative embodiments, the solid filler includes an inorganic filler. Representative inorganic fillers for use in accordance with the present disclosure include but are not limited to sodium carbonate, calcium carbonate, magnesium carbonate, barium sulfate, magnesium sulfate, aluminum sulfate, magnesium oxide, calcium oxide, alumina, mica, talc, silica, clay (e.g., non-swellable clay), glass spheres, titanium dioxide, aluminum hydroxide, zeolites, and a combination thereof. In illustrative embodiments, the inorganic filler includes an alkali metal carbonate, an alkaline earth metal carbonate, an alkali metal sulfate, an alkaline earth metal sulfate, or a combination thereof. In one example, the inorganic filler includes calcium carbonate.

In addition to containing one or more thermoplastic polymers and an optional solid filler, one or more of the first layer 12, the third layer 14, the fourth layer 18, and the fifth layer 20 may optionally contain one or more additional components to improve the film properties or processing of the shrink film 10. Representative optional components include but are not limited to anti-oxidants (e.g., added to reduce the tendency of the film to discolor over time) and processing aids (e.g., added to facilitate extrusion of the precursor film). In one example, the amount of one or more anti-oxidants in the precursor film is less than about 1% by weight of the film, and the amount of one or more processing aids is less than about 5% by weight of the film. Additional optional additives include but are not limited to whitening agents (e.g., titanium dioxide), which may be added to increase the opacity of the film. In one example, the amount of one or more whitening agents is less than about 10% by weight of the film. Further optional components include but are not limited to antiblocking agents (e.g., diatomaceous earth) and slip agents (e.g. erucamide), which may be added to allow film rolls to unwind properly and to facilitate secondary processing. In one example, the amount of one or more antiblocking agents and/or one or more slip agents is less than about 5% by weight of the film. Further additional optional additives include but are not limited to scents, deodorizers, pigments other than white, noise reducing agents, and/or the like, and combinations thereof. In one example, the amount of one or more scents, deodorizers, pigments other than white, and/or noise reducing agents is less than about 10% by weight of the film.

The blocking polymer (or combination of blocking polymers) used to form the second layer 16 of blocked shrink bundling film 10 in accordance with the present disclosure is not restricted, and may include all manner of polymers having an inherent tendency to block (i.e., form an attraction and/or adhere to an adjacent layer of film or sheet). Representative blocking polymers for use in accordance with the present disclosure include but are not limited to very low density polyethylene (e.g., having a density between about 0.900 g/cm$^3$ and about 0.910 g/cm$^3$), ultra-low density polyethylene (e.g., having a density less than about 0.900 g/cc), ethylene-alpha olefin copolymers, and/or the like, and combinations thereof. Representative VLDPE resins in accordance with the present disclosure include but are not limited to metallocene polyethylene resins, the VLDPE resins sold under the trade name FLEXOMER™ by the Dow Chemical Company, and/or the like. Representative ethylene-alpha olefin copolymers for use in accordance with the present disclosure include but are not limited to plastomers, ethylene vinyl acetate, and/or the like. In illustrative embodiments, the blocking polymer is a very low density polyethylene resin, an ultra-low density polyethylene resin, an ethylene-alpha olefin copolymer, or a combination thereof. In illustrative embodiments, the blocking polymer is a very low density polyethylene resin. In other illustrative embodiments, the blocking polymer is an ultra-low density polyethylene resin. In further illustrative embodiments, the blocking polymer is an ethylene-alpha olefin copolymer which, in illustrative embodiments, is ethylene-vinyl acetate.

In some embodiments, each of the first layer 12 and the fifth layer 20 of the blocked shrink bundling film 10 comprises a combination of low density polyethylene and high density polyethylene or, in other embodiments, a combination of metallocene polyethylene, low density polyethylene, and high density polyethylene or, in further embodiments, a combination of low density polyethylene and linear low density polyethylene. In illustrative embodiments, each of the first layer 12 and the fifth layer 20 of the blocked shrink bundling film 10 comprises low density polyethylene in an amount of between about 30 wt. % and about 95 wt. % (in other embodiments between about 70 wt. % and about 95 wt. %) and high density polyethylene in an amount of between about 5 wt. % and about 70 wt. % (in other embodiments between about 5 wt. % and about 30 wt. %) based on the total weight of the material used to extrude these respective layers. In further illustrative embodiments, each of the first layer 12 and the fifth layer 20 of the blocked shrink bundling film 10 comprises low density polyethylene in an amount of between about 30 wt. % and about 80 wt. % (in other embodiments between about 50 wt. % and about 80 wt. %) and linear low density polyethylene in an amount of between about 15 wt. % and about 70 wt. % (in other embodiments between about 15 wt. % and about 50 wt. %) based on total weight of the material used to extrude these respective layers. In some embodiments, each of the first layer 12 and the fifth layer 20 of the blocked shrink bundling film 10 optionally further comprises an anti-block agent and/or a processing aid.

In illustrative embodiments, each of the third layer 14 and the fourth layer 18 of the blocked shrink bundling film 10 comprises a combination of low density polyethylene, linear low density polyethylene, and high density polyethylene or, in other embodiments, a combination of low density polyethylene, linear low density polyethylene, high density polyethylene, and calcium carbonate. In illustrative embodiments, each of the third layer 14 and the fourth layer 18 of the blocked shrink bundling film 10 comprises low density polyethylene in an amount of between about 25 wt. % and about 80 wt. % (in other embodiments between about 50 wt. % and about 80 wt. %), linear low density polyethylene in an amount of between about 5 wt. % and about 65 wt. % (in other embodiments between about 5 wt. % and about 35 wt. %), and high density polyethylene in an amount of between about 5 wt. % and about 75 wt. % (in other embodiments between about 5 wt. % and about 30 wt. %) based on the total weight of the material used to extrude these respective layers. In further illustrative embodiments, each of the third layer 14 and the fourth layer 18 of the blocked shrink bundling film 10 comprises low density polyethylene in an amount of between about 20 wt. % and about 80 wt. % (in other embodiments between about 40 wt. % and about 70 wt. %), linear low density polyethylene in an amount of between about 5 wt. % and about 65 wt. % (in other embodiments between about 5 wt. % and about 35 wt. %), high density polyethylene in an amount of between about 5 wt. % and about 70 wt. % (in some embodiments between about 5 wt. % and about 30 wt. %), and calcium carbonate in an amount of between about 5 wt. % and about 25 wt. % based on total weight of the material used to extrude these respective layers.

Exemplary configurations for a five-layered, blocked shrink bundling film 10 in accordance with the present disclosure include but are not limited to the following representative CBABC structures: (1) LDPE-HDPE/LLDPE-HDPE-LDPE/FLEXOMER™/LLDPE-HDPE-LDPE/LDPE-HDPE; (2) LDPE-HDPE/LLDPE-HDPE-LDPE/EVA/LLDPE-HDPE-LDPE/LDPE-HDPE; (3) mPE-LDPE-HDPE/LLDPE-HDPE-LDPE/FLEXOMER™/LLDPE-HDPE-LDPE/mPE-LDPE-HDPE; and (4) mPE-LDPE-HDPE/LLDPE-HDPE-LDPE-CaCO$_3$/FLEXOMER™/LLDPE-HDPE-LDPE-CaCO$_3$/mPE-LDPE-HDPE.

As shown in FIG. 1, the blocked shrink bundling film 10 has a five-layer structure that includes the first layer 12, the blocking polymer-containing second layer 16, the third layer 14 interposed between the first layer 12 and the second layer 16, the fifth layer 20, and the fourth layer 18 interposed between the second layer 16 and the fifth layer 20. The amount by weight of each of these respective layers is not restricted, and may be varied based on desired end use. In some embodiments, one or both of the first layer 12 and the fifth layer 20 is between about 10% and about 15% by weight of the blocked, five-layered shrink film 10. In illustrative embodiments, each of the first layer 12 and the fifth layer 20 is about 12.50% by weight of the blocked, five-layered shrink film 10. In some embodiments, the blocking polymer-containing second layer 16 is between about 10% and about 20% by weight of the blocked, five-layered shrink film 10. In illustrative embodiments, the second layer 16 is about 15.00% by weight of the blocked, five-layered shrink film 10. In some embodiments, one or both of the third layer 14 and the fourth layer 18 is between about 20% and about 40% by weight of the blocked, five-layered shrink film 10. In illustrative embodiments, each of the third layer 14 and the fourth layer 18 is about 30.00% by weight of the blocked, five-layered shrink film 10.

The overall thickness of a blocked shrink bundling film 10 in accordance with the present disclosure may be varied depending on the particular end use for which the shrink film is manufactured. In one example, blocked shrink bundling films in accordance with the present disclosure may have a thickness in the range of typical thicknesses for shrink bundling films. However, the thickness may be varied to be any suitable thickness in accordance with the present disclosure.

In one example, a blocked shrink bundling film 10 in accordance with the present disclosure has a gauge ranging from about 1.0 mil to about 5.0 mil. In another example, a blocked shrink bundling film 10 in accordance with the present disclosure has a gauge ranging from about 1.0 mil to about 4.5 mil, in some examples from about 1.1 mil to about 4.3 mil, in some examples from about 1.1 mil to about 4.2 mil, in some examples from about 1.1 mil to about 4.1 mil, in some examples from about 1.1 mil to about 4.0 mil, in some examples from about 1.2 mil to about 3.9 mil, in some examples from about 1.2 mil to about 3.8 mil, in some examples from about 1.2 mil to about 3.7 mil, in some examples from about 1.2 mil to about 3.6 mil, and in some examples from about 1.2 mil to about 3.5 mil. In illustrative embodiments, a blocked shrink bundling film 10 in accordance with the present disclosure (which, in some embodiments, is formed from a molten tubular film having a wall thickness of between about 0.5 mil and about 1.75 mil and, in other embodiments, of between about 0.7 mil and about 1.75 mil) has a gauge ranging from about 1.5 mil to about 3.5 mil. In these gauge ranges, it has been discovered that a blocked shrink film in accordance with the present disclosure performs better than a higher gauge conventional film, in terms of load containment and shrink properties.

In illustrative embodiments, a process for making the multi-layered, blocked shrink bundling film 10 in accordance with the present disclosure includes (a) extruding two or more extrudable materials through a die to form a molten tubular film, wherein at least a first extrudable material comprises a first polyolefin and is configured to form at least a first layer of the molten tubular film, and wherein at least a second extrudable material comprises a blocking polymer and is configured to form at least a second layer of the molten tubular film, (b) injecting the molten tubular film with air to form a film bubble, wherein an interior surface of the film bubble is provided by the second layer of the molten tubular film, (c) drawing the film bubble away from the die, and (d) collapsing the film bubble upon itself, such that a first interior surface of the film bubble adheres to an adjacent second interior surface of the film bubble via blocking, thereby forming the blocked shrink film.

Figure 2:
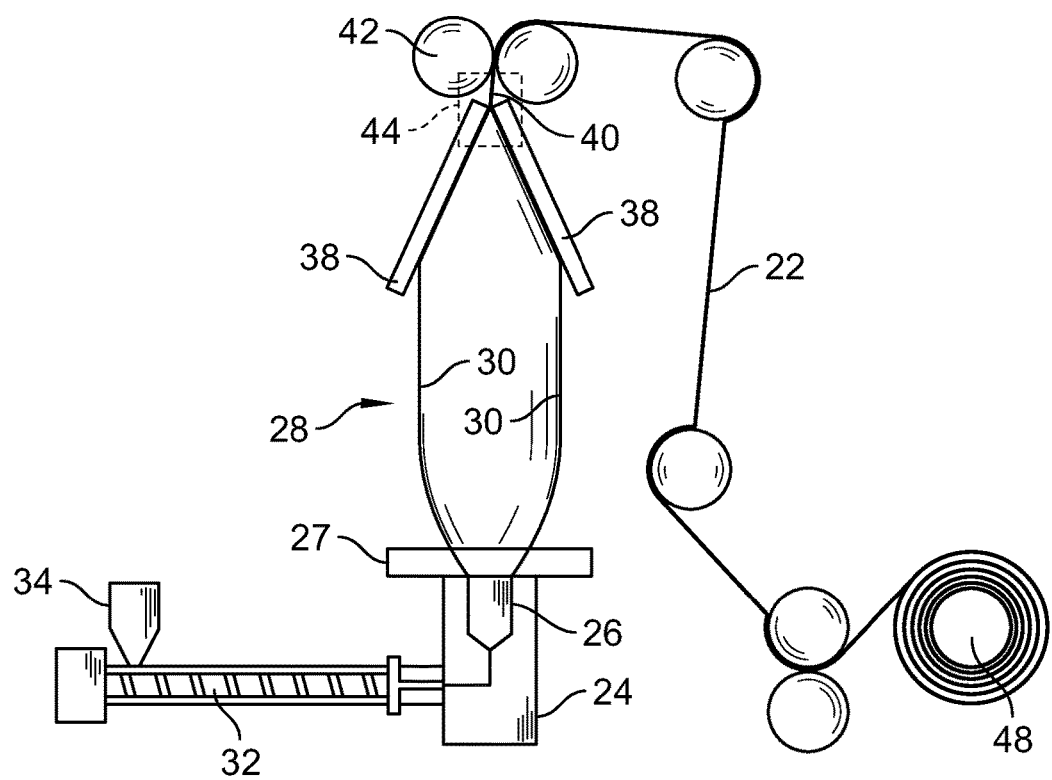
FIG. 2 is a diagrammatic view of an exemplary process for forming a blocked shrink bundling film via a blown film extrusion process.

In illustrative embodiments, a process for making the multi-layered, blocked shrink bundling film 10 in accordance with the present disclosure may be executed as shown in simplified schematic form in FIG. 2. The process includes feeding two or more extrudable materials—in illustrative embodiments, three or more extrudable materials—to an extruder 32 via a hopper 34. The molten polymeric material is extruded through a die 24 to form a molten tubular film 26. Air is injected into an interior of the molten tubular film 26 through the die 24, which results in the formation of a film bubble 28. The interior surface and/or exterior surface of the film bubble 28 may be cooled using blown air from the air ring 27.

In illustrative embodiments, an interior surface 30 of the film bubble 28 is provided by the layer of the molten tubular film that includes the blocking polymer (e.g., the second layer 16 shown in FIG. 1). The film bubble 28 is drawn away from the die 24 in a machine direction or, in some embodiments, in a direction transverse to the machine direction. In some embodiments, the film bubble 28 is drawn away from the die 24 in both a machine direction and a direction transverse to the machine direction (the latter, in some embodiments, being a result of the expansion of film bubble 28). The drawing of the film bubble causes a reduction in the thickness of the walls of film bubble 28. In addition, the drawing of the film bubble imparts orientation and shrink forces to the material, which may be harnessed at a later date when heat is applied to the shrink film. The film bubble 28 continues its expansion until it comes in contact with a collapsing frame 38, at which point the film bubble 28 begins to collapse upon itself to from a lay-flat tubular film 40. In the lay-flat tubular film 40 formed when collapse first occurs, the opposing interior surfaces 30 of the film bubble 28 are brought into physical contact and begin to fuse together via blocking resulting in the formation of a blocked shrink bundling film 22. Although not shown in FIG. 2, additional steps may optionally be taken to promote blocking between adjacent layers of the collapsed film bubble 40 (e.g., by increasing a temperature and/or a pressure on a portion of the collapsed film bubble 40). In addition, although not shown in FIG. 2, one or more edges of the blocked shrink film 22 may optionally be cut if desired. The blocked shrink bundling film 22 may then be passed through nip rollers 42 and wound onto a roller 48.

Figure 3:
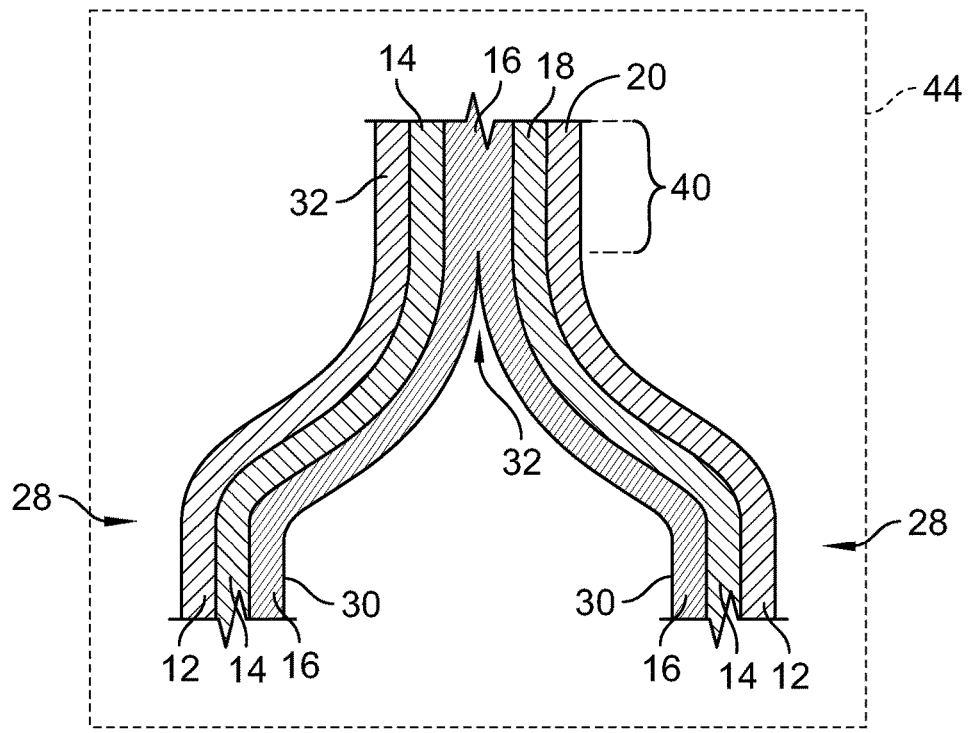
FIG. 3 is a diagrammatic view of a three-layered film bubble collapsing into a five-layered blocked shrink bundling film.

FIG. 3 shows a simplified schematic view of the region 44 delineated in FIG. 2. For purposes of illustration, the film bubble 28 is shown as a three-layered structure which is configured to collapse into a five-layered blocked shrink bundling film analogous to the shrink film 10 shown in FIG. 1. As shown in FIG. 3, the film bubble 28 is formed from a three-layered molten tubular film that includes a first layer 12, a second layer 16, and a third layer 14. The second layer 16 includes a blocking polymer. As the film bubble 28 approaches and contacts the collapsing frame 38 of FIG. 2, the film bubble 28 begins to collapse upon itself near a region 32, thereby initiating formation of the lay-flat tubular film 40. In the lay-flat tubular film 40, the opposing interior surfaces 30 of the film bubble 28 are brought into physical contact with one another and begin to fuse together via blocking, eventually resulting in the formation of the five-layered, blocked shrink bundling film 10 of FIG. 1 that contains the first layer 12, the second layer 16, the third layer 14, the fourth layer 18, and the fifth layer 20.

Figure 4:
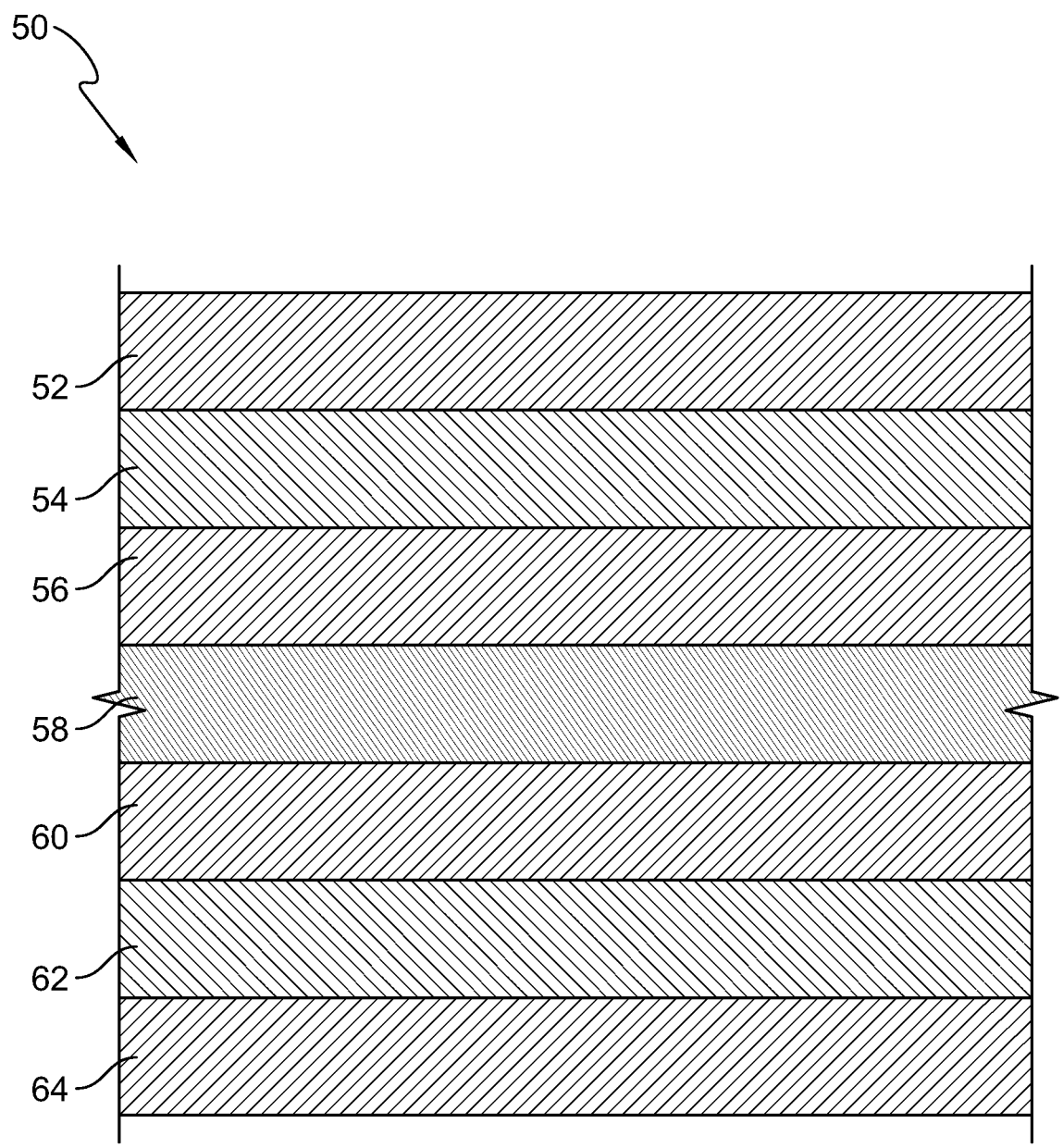
FIG. 4 is a diagrammatic view of a representative second embodiment of a blocked shrink bundling film that includes seven layers.

A second embodiment of a multi-layered, blocked shrink bundling film 50 in accordance with the present disclosure is shown in FIG. 4. The multi-layered blocked shrink film 50 has a seven-layered structure and includes a first layer 52, a second layer 54, a third layer 56, a fourth layer 58, a fifth layer 60, a sixth layer 62, and a seventh layer 64. The fourth layer 58 includes a blocking polymer. Each of the first layer 52, the second layer 54, the third layer 56, the fifth layer 60, the sixth layer 62, and the seventh layer 64 may include a thermoplastic polymer (or combination of thermoplastic polymers), and each layer may be the same as or different than one or more of the other layers. In illustrative embodiments, as explained above in references to FIGS. 2 and 3, the first layer 52 and the seventh layer 64 are identical, the second layer 54 and the sixth layer 62 are identical, and the third layer 56 and the fifth layer 60 are identical. This symmetry arises from the blown film extrusion process in which a four-layered molten tubular film forms a film bubble which, upon collapse and blocking, results in the final seven-layered structure shown in FIG. 4.

Figure 5:
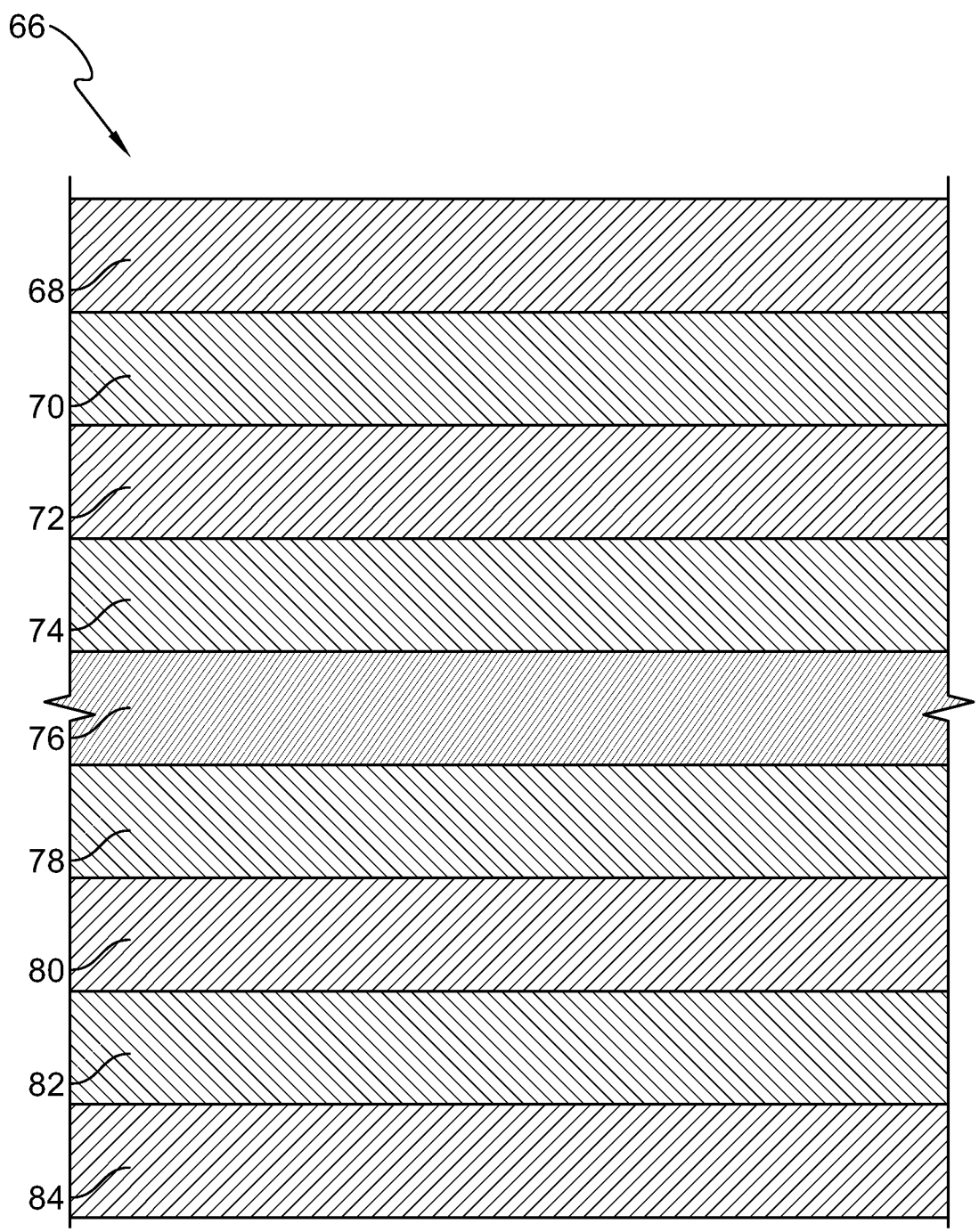
FIG. 5 is a diagrammatic view of a representative third embodiment of a blocked shrink bundling film that includes nine layers.

A third embodiment of a multi-layered, blocked shrink bundling film 66 in accordance with the present disclosure is shown in FIG. 5. The multi-layered blocked shrink film 66 has a nine-layered structure and includes a first layer 68, a second layer 70, a third layer 72, a fourth layer 74, a fifth layer 76, a sixth layer 78, a seventh layer 80, an eighth layer 82, and a ninth layer 84. The fifth layer 76 includes a blocking polymer. Each of the first layer 68, the second layer 70, the third layer 72, the fourth layer 74, the sixth layer 78, the seventh layer 80, the eighth layer 82, and the ninth layer 84 may include a thermoplastic polymer (or combination of thermoplastic polymers), and each layer may be the same as or different than one or more of the other layers. In illustrative embodiments, as explained above in references to FIGS. 2 and 3, the first layer 68 and the ninth layer 84 are identical, the second layer 70 and the eighth layer 82 are identical, the third layer 72 and the seventh layer 80 are identical, and the fourth layer 74 and the sixth layer 78 are identical. This symmetry arises from the blown film extrusion process in which a five-layered molten tubular film forms a film bubble which, upon collapse and blocking, results in the final nine-layered structure shown in FIG. 5.

The following examples and representative procedures illustrate features in accordance with the present disclosure, and are provided solely by way of illustration. They are not intended to limit the scope of the appended claims or their equivalents.

EXAMPLES

General

For production of the example films, an extrusion blown film line with up to 5 extruders were used. The "A" and "E" extruders are 3" in diameter, the "B" and D" extruders are 2" in diameter and the "C" extruder is 2½" in diameter. The extruders feed into a die manufactured by Davis-Standard (formerly Gloucester) of Gloucester, Mass., that is 16" diameter. For the samples described herein, the gap was maintained between 0.050" and 0.090".

Example 1—Five-Layered Blocked Shrink Bundling Films

In this experiment, five-layered shrink bundling films having the final formulations FX-17i724-01 shown in Table 1, FX-17i724-02 shown in Table 2, and FX-17i724-03 shown in Table 3 were prepared.

TABLE 1

Composition of FX-17i724-01.

| LAYER | Layer % (Total) | COMPONENT | Amount of Component (Weight %) |
|---|---|---|---|
| A | 12.50 | AGILITY ™ 2001, Dow Chemical Company, LDPE resin | 65.00 |
| | | MarFlex ® D350, Chevron Phillips, m-LLDPE | 32.00 |
| | | ABC2000HC, Polyfil Corporation, anti-block agent | 2.00 |
| | | 79600, Standridge Color Corporation, process aid | 1.00 |
| B | 30.00 | LDPE group, see Table 4 | 65.00 |
| | | LLDPE-butene group, see Table 5 | 20.00 |
| | | Marlex ® HHM 5502BN, Chevron Phillips, HDPE | 15.00 |
| C | 15.00 | FLEXOMER ™ ETS-9066, Dow Chemical Company, VLDPE resin | 100.00 |
| D | 30.00 | Same as Layer B | Same as Layer B |
| E | 12.50 | Same as Layer A | Same as Layer A |

TABLE 2

Composition of FX-17i724-02.

| LAYER | Layer % (Total) | COMPONENT | Amount of Component (Weight %) |
|---|---|---|---|
| A | 12.50 | LDPE group, see Table 4 | 84.00 |
| | | Marlex ® HHM 5502BN, Chevron Phillips, HDPE | 13.00 |
| | | ColorTech 10296-18, anti-block agent | 2.00 |
| | | 79600, Standridge Color Corporation, process aid | 1.00 |
| B | 30.00 | LDPE group, see Table 4 | 65.00 |
| | | LLDPE-butene group, see Table 5 | 20.00 |
| | | Marlex ® HHM 5502BN, Chevron Phillips, HDPE | 15.00 |
| C | 15.00 | FLEXOMER ™ ETS-9066, Dow Chemical Company, VLDPE resin | 100.00 |
| D | 30.00 | Same as Layer B | Same as Layer B |
| E | 12.50 | Same as Layer A | Same as Layer A |

TABLE 3

Composition of FX-17i724-03.

| LAYER | Layer % (Total) | COMPONENT | Amount of Component (Weight %) |
|---|---|---|---|
| A | 12.50 | LDPE group, see Table 4 | 84.00 |
| | | Marlex ® HHM 5502BN, Chevron Phillips, HDPE | 13.00 |
| | | ColorTech 10296-18, anti-block agent | 2.00 |
| | | AD79600 (Standridge Color Corporation, process aid) | 1.00 |
| B | 30.00 | LDPE group, see Table 4 | 55.00 |
| | | LLDPE-butene group, see Table 5 | 20.00 |
| | | Marlex ® HHM 5502BN, Chevron Phillips, HDPE | 15.00 |
| | | HM10LC, Heritage Plastics, calcium carbonate | 10.00 |
| C | 15.00 | FLEXOMER ™ ETS-9066, Dow Chemical Company, VLDPE resin | 100.00 |
| D | 30.00 | Same as Layer B | Same as Layer B |
| E | 12.50 | Same as Layer A | Same as Layer A |

Representative alternatives for the LDPE group and LLDPE-butene group in Tables 1-3 are shown below in Tables 4 and 5, respectively.

TABLE 4

Representative LDPE alternatives.

EF601AS
(Westlake Chemical, LDPE)
133A
(Dow Chemical Company, LDPE)
PETROTHENE ® NA940085
(Equistar/LyondellBasell, LDPE)
NOVAPOL ® LF-Y320-C
(NOVA Chemicals, LDPE)
LD051.LQ
(ExxonMobil, LDPE)

TABLE 5

Representative LLDPE alternatives.

NOVAPOL ® PF-0118-C
(NOVA Chemicals, butene LLDPE)
LL 1001X76
(ExxonMobil, butane LLDPE)
PETROTHENE ® GA501021
(Equistar/LyondellBasell, LLDPE)

Example 2—Performance Data for Five-Layered Blocked Shrink Bundling Films

In this experiment, the physical properties of the five-layered shrink bundling films having formulations FX-17i724-01, FX-17i724-02, and FX-17i724-03 were measured are summarized in Table 6-8 below.

TABLE 6

Ultimate Tensile and Ultimate Tensile Yield Data for Films FX-17i724-01, FX-17i724-02, and FX-17i724-03

| Film | Ultimate Tensile (psi) | | Ultimate Tensile Yield | |
|---|---|---|---|---|
| | MD | TD | MD | TD |
| FX-17i724-01 | 5949 | 3064 | 2170 | 1932 |
| FX-17i724-02 | 5954 | 2827 | 2667 | 1774 |
| FX-17i724-03 | 5420 | 2748 | 2346 | 1767 |

TABLE 7

Elongation, 1% Secant Modulus, Shrink, and COF Data for Films FX-17i724-01, FX-17i724-02, and FX-17i724-03.

| Film | Elongation (%) | | 1% Secant Modulus | | Shrink (%) | | COF | |
|---|---|---|---|---|---|---|---|---|
| | MD | TD | MD | TD | MD | TD | Static | Kinetic |
| FX-17i724-01 | 83 | 572 | 38160 | 51566 | 83.0 | 3.5 | 0.428 | 0.379 |
| FX-17i724-02 | 83 | 614 | 39616 | 52465 | 82.5 | 7.0 | 0.370 | 0.345 |
| FX-17i724-03 | 74 | 607 | 39641 | 50674 | 81.0 | 5.0 | 0.419 | 0.345 |

TABLE 8

Tear, Puncture, Haze, Gloss, and Thickness Data for Films FX-17i724-01, FX-17i724-02, and FX-17i724-03.

| Film | Tear (gf) | | Puncture | Haze | Gloss | Thickness (mil) |
|---|---|---|---|---|---|---|
| | MD | TD | (lbsf) | (%) | (45) | |
| FX-17i724-01 | 248 | 209 | 10.66 | 13.9 | 51.5 | 1.6 |
| FX-17i724-02 | 246 | 237 | 10.41 | 32.4 | 20.5 | 1.7 |
| FX-17i724-03 | 979 | 193 | 9.93 | 52.9 | 29.9 | 1.7 |

The overall thickness of the blocked shrink bundling film may be varied depending on the particular end use for which the film is manufactured. In illustrative embodiments, films in accordance with the present disclosure have a thickness in the range of typical thicknesses for shrink films, but may be easily adjusted to fit a desired end use. However, as described above, the beneficial properties of films in accordance with the present disclosure may allow the films to be used at a decreased gauge or thickness as compared to conventional shrink films.

The invention claimed is:

1. A process for making a blocked shrink film, the process comprising the steps of
    extruding two or more extrudable materials through a die to form a molten tubular film, wherein at least a first extrudable material comprises a first polyolefin and is configured to form at least a first layer of the molten tubular film, and wherein at least a second extrudable material comprises a blocking polymer and is configured to form at least a second layer of the molten tubular film,
    injecting the molten tubular film with air to form a film bubble, wherein an interior surface of the film bubble is provided by the second layer of the molten tubular film,
    drawing the film bubble away from the die, and
    collapsing the film bubble upon itself, such that a first interior surface of the film bubble adheres to an adjacent second interior surface of the film bubble via blocking, thereby forming the blocked shrink film,
    wherein the first polyolefin comprises high density polyethylene, and
    wherein the blocking polymer is very low density polyethylene.

2. The process of claim 1 wherein the first polyolefin further comprises low density polyethylene and metallocene polyethylene.

3. The process of claim 1 wherein the second extrudable material further comprises ethylene-vinyl acetate.

4. The process of claim 1 further comprising the step of extruding three or more extrudable materials to form the molten tubular film, wherein at least a third extrudable material comprises a second polyolefin and is configured to form at least a third layer of the molten tubular film, and wherein the third layer is disposed between the first layer and the second layer, wherein the second polyolefin comprises linear low density polyethylene, high density polyethylene, low density polyethylene, and calcium carbonate.

5. The process of claim 1 wherein the drawing of the film bubble occurs in a machine direction and in a direction transverse to the machine direction.

6. The process of claim 1 wherein the collapsing is initiated when the film bubble contacts a collapsing frame.

7. The process of claim 1 further comprising the step of promoting the blocking by increasing a temperature and/or a pressure on a portion of the collapsed film bubble.

8. The process of claim 1 wherein a thickness of a wall of the molten tubular film is between about 0.5 mil and about 1.75 mil, and wherein a thickness of the blocked shrink film is between about 1.0 mil and about 3.5 mil.

9. The process of claim 4, wherein the molten tubular film has a three-layer structure, and wherein the blocked shrink film has a five-layer structure.

10. The process of claim 1, wherein the blocked shrink film comprises at least seven layers.

11. The process of claim 1, wherein the blocked shrink film comprises at least nine layers.

12. A process for making a blocked shrink film, the process comprising the steps of
extruding three or more extrudable materials through a die to form a molten tubular film, wherein at least a first extrudable material comprises low density polyethylene, high density polyethylene, metallocene polyethylene, linear low density polyethylene, or a combination thereof and is configured to form at least a first layer of the molten tubular film, wherein at least a second extrudable material comprises very low density polyethylene, and is configured to form at least a second layer of the molten tubular film, wherein at least a third extrudable material comprises linear low density polyethylene, high density polyethylene, low density polyethylene, calcium carbonate, or a combination thereof and is configured to form at least a third layer of the molten tubular film, and wherein the third layer is disposed between the first layer and the second layer,
injecting the molten tubular film with air to form a film bubble, wherein an interior surface of the film bubble is provided by the second layer of the molten tubular film,
drawing the film bubble away from the die, and
collapsing the film bubble upon itself, such that a first interior surface of the film bubble adheres to an adjacent second interior surface of the film bubble via blocking, thereby forming the blocked shrink film,
wherein at least one of the first or third extrudable materials comprises high density polyethylene.

13. The process of claim 12, wherein the first extrudable material comprises low density polyethylene and high density polyethylene and the low density polyethylene is present in an amount of between about 30 wt. % and about 95 wt. % and the high density polyethylene is present in an amount of between about 5 wt. % and about 70 wt. % based on total weight of the first extrudable material.

14. The process of claim 12, wherein the first extrudable material comprises low density polyethylene and linear low density polyethylene and the low density polyethylene is present in an amount of between about 30 wt. % and about 80 wt. % and the linear low density polyethylene is present in an amount of between about 15 wt. % and about 70 wt. % based on total weight of the first extrudable material.

15. The process of claim 12, wherein the first extrudable material further comprises an antiblock agent, a process aid, or a combination thereof.

16. The process of claim 12, wherein the third extrudable material comprises low density polyethylene, linear low density polyethylene, and high density polyethylene and the low density polyethylene is present in an amount of between about 20 wt. % and about 80 wt. %, the linear low density polyethylene is present in an amount of between about 5 wt. % and about 65 wt. %, and the high density polyethylene is present in an amount of between about 5 wt. % and about 75 wt. % based on total weight of the third extrudable material.

17. The process of claim 12 wherein the third extrudable material comprises low density polyethylene, linear low density polyethylene, high density polyethylene, and calcium carbonate and the low density polyethylene is present in an amount of between about 20 wt. % and about 80 wt. %, the linear low density polyethylene is present in an amount of between about 5 wt. % and about 65 wt. %, the high density polyethylene is present in an amount of between about 5 wt. % and about 70 wt. %, and the calcium carbonate is present in an amount of between about 5 wt. % and about 25 wt. % based on total weight of the third extrudable material.

18. A process for making a blocked, five-layered shrink film, the process comprising the steps of
extruding three extrudable materials through a die to form a molten tubular film, wherein a first extrudable material comprises low density polyethylene, high density polyethylene, metallocene polyethylene, linear low density polyethylene, or a combination thereof and is configured to form a first layer and a fifth layer of the molten tubular film, wherein a second extrudable material comprises a very low density polyethylene and is configured to form a second layer of the molten tubular film, wherein a third extrudable material comprises linear low density polyethylene, high density polyethylene, low density polyethylene, calcium carbonate, or a combination thereof and is configured to form a third layer and a fourth layer of the molten tubular film, wherein the third layer is disposed between the first layer and the second layer, and wherein the fourth layer is disposed between the second layer and the fifth layer,
injecting air into an interior of the molten tubular film through the die to form a film bubble, wherein an interior surface of the film bubble is provided by the second layer of the molten tubular film,
drawing the film bubble away from the die, thereby imparting orientation to the molten tubular film,
cooling an exterior surface and/or the interior surface of the air bubble with blown air,
collapsing the film bubble upon itself, such that a first interior surface of the film bubble adheres to an adjacent second interior surface of the film bubble via blocking, thereby forming the blocked, five-layered shrink film,
wherein at least one of the first or third extrudable materials comprises high density polyethylene.

19. The process of claim 18 wherein a thickness of a wall of the molten tubular film is between about 0.5 mil and about 1.75 mil, and wherein a thickness of the blocked, five-layered shrink film is between about 1.0 mil and about 3.5 mil.

20. The process of claim 18, wherein the first layer comprises from about 5% to about 15% by weight of the blocked, five-layered shrink film, the second layer comprises from about 20% to about 40% by weight of the blocked, five-layered shrink film, the third layer comprises from about 10% to about 25% by weight of the blocked, five-layered shrink film, the fourth layer comprises from about 20% to about 40% by weight of the blocked, five-layered shrink film, and the fifth layer comprises from about 5% to about 15% by weight of the blocked, five-layered shrink film.

* * * * *